United States Patent
Tokito et al.

(10) Patent No.: US 12,246,662 B2
(45) Date of Patent: Mar. 11, 2025

(54) VEHICLE

(71) Applicant: TOYOTA JIDOSHA KABUSHIKI KAISHA, Toyota (JP)

(72) Inventors: Aya Tokito, Toyota (JP); Kenjiro Shiba, Takahama (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 252 days.

(21) Appl. No.: 18/176,878

(22) Filed: Mar. 1, 2023

(65) Prior Publication Data

US 2023/0382325 A1 Nov. 30, 2023

(30) Foreign Application Priority Data

May 30, 2022 (JP) ................. 2022-087400

(51) Int. Cl.
*B60R 16/023* (2006.01)
*B60L 1/00* (2006.01)
*B60L 3/00* (2019.01)

(52) U.S. Cl.
CPC .................. *B60R 16/0239* (2013.01)

(58) Field of Classification Search
CPC . B60R 16/0239; H05K 5/0204; H05K 5/0091
See application file for complete search history.

(56) References Cited

U.S. PATENT DOCUMENTS

| | | | |
|---|---|---|---|
| 10,160,286 B2 * | 12/2018 | Mori ...................... B60H 1/143 |
| 2003/0048611 A1 * | 3/2003 | Skofljanec ......... H05K 7/20854 |
| | | | 361/719 |
| 2014/0131536 A1 * | 5/2014 | Riedel ................. B60R 16/0239 |
| | | | 248/231.9 |
| 2018/0110146 A1 * | 4/2018 | Coles ..................... H05K 5/065 |
| 2018/0178623 A1 | 6/2018 | Sakashita et al. |
| 2019/0031122 A1 * | 1/2019 | Chitaka ............... H05K 5/0217 |
| 2020/0231098 A1 * | 7/2020 | Takenaga ........... B60R 16/0239 |
| 2021/0100114 A1 * | 4/2021 | Takahashi .......... B60R 16/0239 |
| 2021/0213818 A1 | 7/2021 | Furukawa et al. |

(Continued)

FOREIGN PATENT DOCUMENTS

| | | |
|---|---|---|
| JP | 2011-006037 A | 1/2011 |
| JP | 2013-032116 A | 2/2013 |
| JP | 2013-089448 A | 5/2013 |

(Continued)

*Primary Examiner* — Hoa C Nguyen
*Assistant Examiner* — Amol H Patel
(74) *Attorney, Agent, or Firm* — Oliff PLC (57) ABSTRACT

The vehicle body disclosed herein includes an electrical component disposed at a rear portion of the vehicle body, a base bracket that covers a lower portion of the electrical component, and a cover that is attached to the base bracket and covers an upper portion of the electrical component. The cover has a cover upper wall located above the electrical component and a pair of cover side walls extending from the cover upper wall to the base bracket on both sides of the electrical component in the left-right direction, and the rear of the electrical component has an open shape. The base bracket has a protective wall extending upwardly at the rear of the electrical component. The height of the protective wall relative to the base bracket is smaller than the height of the cover upper wall relative to the base bracket.

6 Claims, 5 Drawing Sheets

(56) References Cited

U.S. PATENT DOCUMENTS

2024/0023267 A1* 1/2024 Ogata ................. B60R 16/0239

FOREIGN PATENT DOCUMENTS

| | | |
|---|---|---|
| JP | 2017-039446 A | 2/2017 |
| JP | 2017-121871 A | 7/2017 |
| JP | 2018-103818 A | 7/2018 |
| JP | 2018-111420 A | 7/2018 |
| JP | 2019-151159 A | 9/2019 |
| JP | 2020-179693 A | 11/2020 |
| JP | 2021-109593 A | 8/2021 |
| JP | 2021-115892 A | 8/2021 |

* cited by examiner

VEHICLE

CROSS-REFERENCE TO RELATED APPLICATION

This application claims priority to Japanese Patent Application No. 2022-087400 filed on May 30, 2022, incorporated herein by reference in its entirety.

BACKGROUND

1. Technical Field

A technique disclosed in the present specification relates to a vehicle including a vehicle body and an electric component disposed at a rear portion of the vehicle body.

2. Description of Related Art

Japanese Unexamined Patent Application Publication No. 2020-179693 (JP 2020-179693 A) discloses, for example, a vehicle in which an electronic component such as a charge and discharge control device for controlling charge and discharge of a battery is disposed at a rear portion of a vehicle body. The vehicle includes a cover panel that covers the electronic component from the rear side. The cover panel protects the rear surface of the electronic component when a cargo mounted in a luggage compartment at the rear portion of the vehicle body moves forward and a load is applied to the electronic component by the cargo from the rear side.

SUMMARY

For example, when a rear collision occurs in a vehicle, a large load is applied to the vehicle from the rear side of the vehicle. The load is transmitted to an electronic component via the vehicle body. A cover panel according to JP 2020-179693 A covers the entire rear surface of the electronic component and a part of each of the upper surface and the lower surface. Therefore, when a large load is applied to the vehicle according to JP 2020-179693 A from the rear side, there is a possibility that the load is applied to the electronic component via the cover panel, and the electronic component is damaged. In order to protect the electronic component, a configuration in which the entire surface of the electronic component is covered by the cover panel is conceivable. However, in such a configuration, the mass of the cover panel increases. The present specification provides a technique capable of firmly protecting the electronic component while suppressing an increase in the mass of the cover panel that protects the electronic component.

A vehicle disclosed in the present specification includes:
 a vehicle body;
 an electric component disposed at a rear portion of the vehicle body;
 a base bracket that covers a lower side of the electric component; and
 a cover that is attached to the base bracket and that covers an upper side of the electric component.
The cover includes
 a cover upper wall located above the electric component, and
 a pair of cover side walls extending from the cover upper wall to the base bracket on both sides of the electric component in a right-left direction.
The cover has an open shape rearward of the electric component.
The base bracket includes a protective wall upwardly extending rearward of the electric component.
A height of the protective wall with respect to the base bracket is less than a height of the cover upper wall with respect to the base bracket.

According to the above-described configuration, the cover and the base bracket cover the electric component from the upper, the lower, and the right and left sides thereof. As a result, at least a part of the upper surface, the lower surface, and the side surface on the right and left sides of the electric component are protected. Further, the cover and the base bracket that cover the electric component from the upper, the lower, and the right and left sides thereof extend in a front-rear direction of the vehicle. Therefore, the cover and the base bracket are less likely to be deformed with respect to a load from the rear side. As a result, the electric component is protected by the cover and the base bracket in the event of a rear collision in the vehicle. Further, the cover has an open shape rearward of the electric component. On an area rearward of the electric component where the cover opens, the protective wall extending upward from the base bracket protects the electric component from the rear side. Further, the height of the protective wall with respect to the base bracket is less than the height of the cover upper wall. Therefore, the mass of the cover is reduced as compared with a configuration in which the protective wall reaches the cover upper wall. As described above, the vehicle disclosed in the present specification can firmly protect the electric component while reducing the mass of the cover that protects the electric component.

Further, for example, a cable may be connected to the electric component from the rear side. If a configuration in which the protective wall extends to the height of the cover upper wall is adopted, the protective wall blocks access to the cable even when the cover is removed. Therefore, workability is deteriorated. According to the above-described configuration, since the height of the protective wall with respect to the base bracket is less than the height of the cover upper wall, it is possible to suppress the deterioration of the workability on the area rearward of the electric component. In the above-described vehicle, since the height of the protective wall of the base bracket is less than the height of the cover upper wall, there arises a concern that the electric component is not protected in the vicinity of the cover upper wall. However, in the vicinity of the cover upper wall, the electric component is firmly protected by the cover upper wall and the pair of cover side walls.

Details of the techniques disclosed in the present specification and further modifications will be described in the "DETAILED DESCRIPTION OF EMBODIMENTS" below.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

In an embodiment of the present technology, the cover may have a shape in which a front side of the electrical component is opened. According to such a configuration, the mass of the cover can be further reduced as compared with a cover in which the front of the electric component is closed.

In an embodiment of the present technology, the cover upper wall of the cover may face a panel extending downward from the lower back or the lower back of the vehicle body in a height direction. According to such a configuration, when a rear surface collision occurs in the vehicle and the panel extending downward from the lower back or the lower back moves forward, these structures come into contact with the cover upper wall from the rear. As a result, the load applied to the cover upper wall is transmitted to the pair of cover side walls, and is further transmitted to the base bracket via the pair of cover side walls. As a result, the load applied to the electrical component is reduced. Thus, the cover upper wall can firmly protect the electrical component.

In an embodiment of the present technology, a heat sink for radiating heat from the electrical component may be provided on an upper surface of the electrical component. In this case, the height of the protective wall may be larger than the height of the upper surface of the electrical component and smaller than the height of the upper end of the heat sink. As a result, the protective wall covers the entire area of the rear surface of the electrical component, and at least a part of the rear surface of the heat sink is opened. The height of the protective wall is smaller than in a configuration in which the protective wall is larger than the height of the upper end of the heat sink. According to such a configuration, the height of the protective wall is appropriately set for the electrical component to be protected, and the mass of the base bracket can be reduced.

In an embodiment of the present technology, the protective wall of the base bracket may extend in the left-right direction beyond the pair of cover side walls of the cover. According to such a configuration, when the rear surface collision of the vehicle occurs, the load applied to the protective wall from the rear is transmitted to the pair of cover side walls of the cover. Accordingly, the electrical component can be firmly protected.

In an embodiment of the present technology, the protective wall of the base bracket may have a first lower end that extends in the left-right direction at a central portion of the protective wall in the left-right direction, a second lower end that is located outside the first lower end in the left-right direction and is located above the first lower end, and a third lower end that connects the first lower end and the second lower end. In this case, the protective wall of the base bracket may extend in the left-right direction beyond the third lower end. According to such a configuration, the lower end portion of the protective wall of the base bracket is supported not only by the first lower end extending in the left-right direction but also by the third lower end extending in a direction crossing the left-right direction. As a result, the rigidity of the protective wall with respect to the load from the rear is improved, and the electrical component is more firmly protected.

EXAMPLES

Figure 1:
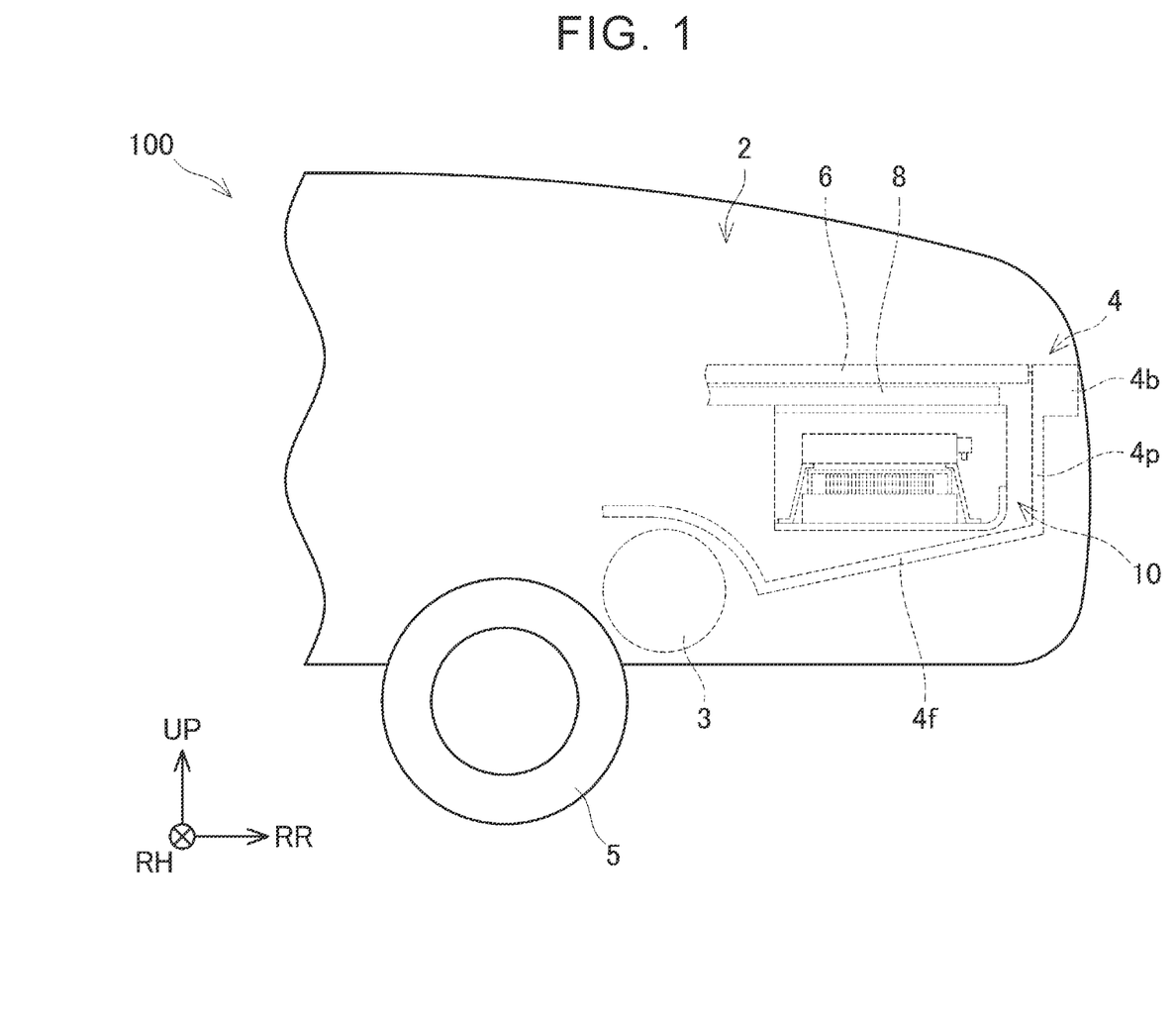
FIG. 1 shows a side view of a rear portion of a vehicle 100 according to an embodiment.

FIG. 1 shows a side view of a rear portion of a vehicle 100 according to an embodiment. FIG. 1 shows in particular a side view of the periphery of a luggage room 2 of a vehicle 100. Vehicles 100 are Plug-in Hybrid Electric Vehicle (PHEV). In the modification, the vehicles 100 may be Battery Electric Vehicle (BEV). In the following description, the rear of the vehicles 100 (i.e., in RR of the arrows in the drawings) is defined as "rear" and vice versa. Further, the upper part of the vehicle 100 (that is, the direction in UP of the arrow in the drawing) is defined as "upper", and the opposite is defined as "lower". Similarly, the right side of the vehicle 100 (i.e., in RH of the arrow in the figure) is defined as "right" and vice versa.

The vehicle 100 includes a vehicle body 4, a traveling motor 3, a deck board 6, a tool box 8, and a converter module 10. The vehicle body 4 includes a lower back 4b, a lower back panel 4p, and a floor panel 4f. The lower back 4b is a skeleton component that extends in the left-right direction (i.e., the back side and the front side direction in FIG. 1) along the lower end of the rear opening of the vehicle 100. The lower back panel 4p is a panel extending downward from the lower back 4b. The floor panel 4f is a panel extending forward from the lower back panel 4p, and constitutes the floor of the vehicle 100.

The traveling motor 3 is disposed below the floor-panel 4f. The traveling motor 3 drives the wheels 5 of the vehicle 100. The converter module 10 comprises a plurality of electrical components, including a first converter 30 and a second converter 32. The detailed structure of the converter module 10 will be described later. A tool box 8 and a deck board 6 are disposed above the converter module 10. The deck board 6 is an interior component constituting the floor of the luggage room 2. In the vehicle 100, by disposing the converter module 10 below the luggage room 2, it is possible to increase the space of the vehicle cabin. Specifically, for example, the position of the seat can be lowered as compared with a configuration in which the converter module 10 is disposed below the seat on which the occupant is seated. Therefore, the space above the seat can be widened without increasing the outer shape of the vehicle 100.

Figure 2:
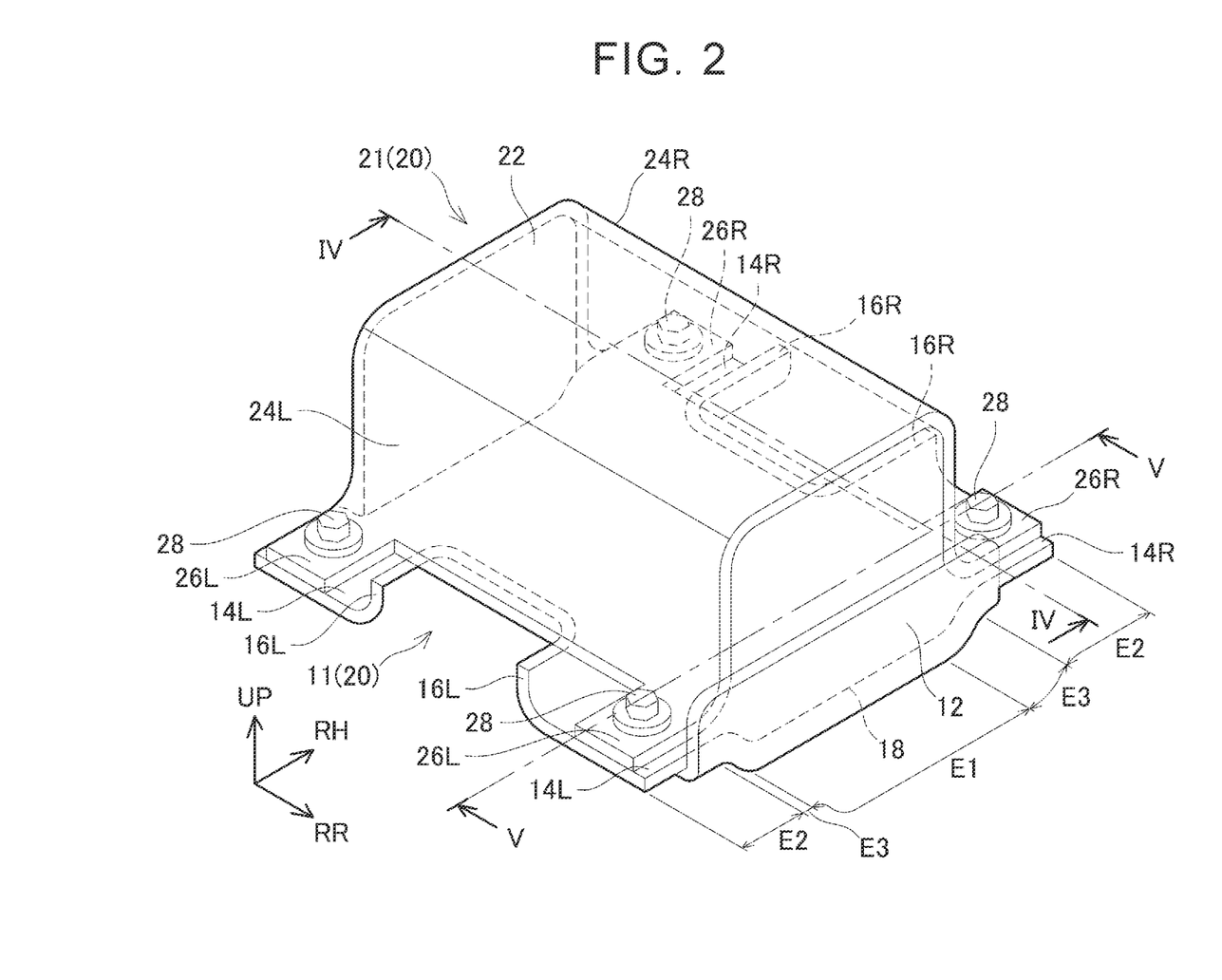
FIG. 2 shows a perspective view of a housing 20 included in the vehicle 100 of the embodiment.
Figure 3:
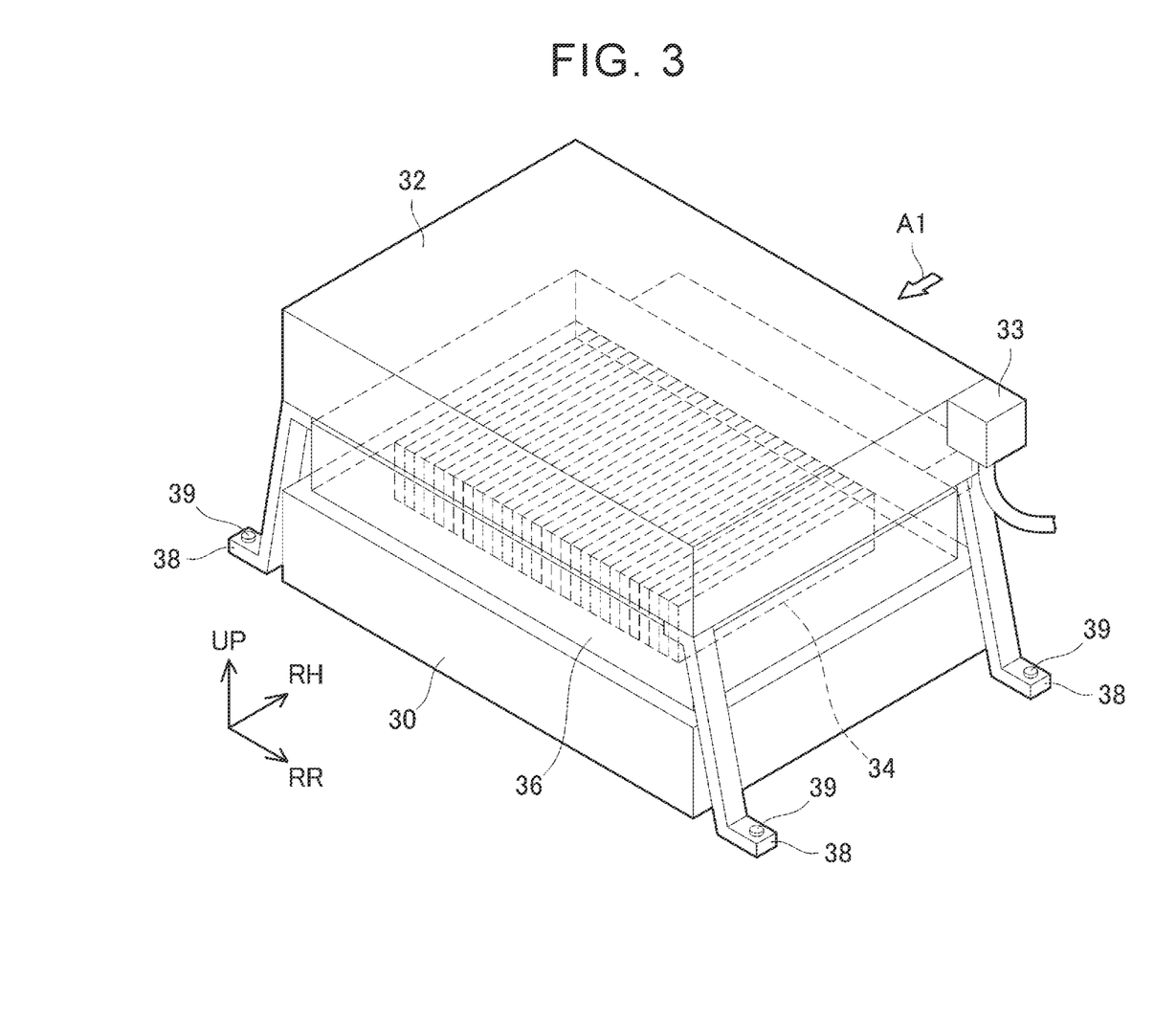
FIG. 3 shows a perspective view of the converter module 10 included in the vehicle 100 of the embodiment.

Referring to FIGS. 2 and 3, the detailed structure of the converter module will be described. The converter module 10 includes a housing 20, a first converter 30, a second converter 32, a duct 36, and a bracket 38. The housing 20 houses and protects the first converter 30, the second converter 32, the duct 36, and the bracket 38.

FIG. 2 shows a perspective view of the housing 20. The housing 20 includes a cover 21 and a base bracket 11. The cover 21 has a portal-shaped cross-sectional shape extending in the front-rear direction. That is, the front end and the rear end of the cover 21 are open. The cover 21 includes a cover upper wall 22, a right cover side wall 24R, a left cover side wall 24L, two right cover fixing portions 26R, and two left cover fixing portions 26L. The cover 21 is typically a sheet metal part formed by press molding. The cover upper wall 22 has a rectangular shape extending in the front-rear direction when viewed from above. The pair of cover side walls 24R, 24L is a wall extending downward from both ends of the cover upper wall 22 in the left-right direction. Each cover-fixing portion 26R, 26L is a seat surface located at an end portion of each side wall 24R, 24L in the front-rear direction and extending in the left-right direction from each side wall 24R, 24L.

The base bracket 11 is a tray-type sheet metal component. The base bracket 11 includes a protective wall 12, a bottom wall 18, two right-side base fixing portions 14R, two left-side base fixing portions 14L, a right-side rim 16R, and a left-side rim 16L. Like the cover 21, the base bracket 11 is also a sheet metal part formed by press molding. The bottom wall 18 is located at the center of the base bracket 11 in the left-right direction, and has a planar shape facing the cover upper wall 22 of the cover 21. The respective base fixing portions 14R, 14L are located at the vehicle-longitudinal end portions of the bottom wall 18. The base-fixing portions 14R, 14L are located above the bottom-wall 18. The base fixing portions 14R, 14L are fastened from above by bolts 28 while abutting against the corresponding cover fixing portions 26R, 26L of the cover 21. The right-side rim 16R is formed across the two right-side base fixing portions 14R, and the left-side rim 16L is formed across the two left-side base fixing portions 14L. Each rim 16R, 16L is a wall extending upward from each base-fixing portion 14R, 14L. Each rim 16R, 16L improves the stiffness of each base-fixing portion 14R, 14L. The respective rims 16R, 16L in particular increase the stiffness of the respective base-fixing portions 14R, 14L against loads from above.

As shown in FIG. 2, the lower end of the protective wall 12 of the base bracket 11 changes in the up-down direction. Specifically, the base brackets 11 have a first lower end E1 extending along the bottom wall 18 at a center portion in the left-right direction, a second lower end E2 extending along each base fixing portion 14R, 14L at the outer side of the first lower end E1, and a third lower end E3 connecting each lower end E1, E2. As described above, the base fixing portions 14R, 14L of the base brackets 11 are positioned above the bottom wall 18. Therefore, the third lower end E3 is bent vertically to connect the respective lower ends E1, E2. Both left and right ends of the protective wall 12 intersect with the second lower end E2. That is, the protective wall 12 extends in the left-right direction beyond the third lower end E3.

As described above, the base bracket 11 is formed by press molding. The protective wall 12 extending in the upward direction is formed by bending the bottom wall 18 extending in the front-rear direction in the upward direction. That is, the protective wall 12 is formed by simple bending with respect to the bottom wall 18. However, the third lower end E3 changes vertically. Therefore, in the third lower end E3, the border between the protective wall 12 and the bottom wall 18 is formed by drawing. As a result, the protective wall 12 is supported not only by the bottom wall 18 extending in the left-right direction but also by a wall changing in the up-down direction. As a result, the protective wall 12 is less likely to be deformed toward the front of the vehicle than a configuration formed only by simple bending of the bottom wall 18. In other words, according to such a configuration, it is possible to improve the rigidity of the protective wall 12 with respect to the load from the rear.

The protective wall 12 of the base bracket 11 extends in the left-right direction beyond the pair of side wall 24R, 24L of the cover 21. Therefore, when a load is applied to the protective wall 12 from behind, the load is transmitted to the pair of side wall 24R, 24L via the protective wall 12. Therefore, even when a large load is applied to the protective wall 12 from the rear side, the protective wall 12 is less likely to be deformed toward the front side of the vehicle. That is, since the protective wall 12 extends in the left-right direction beyond the pair of side wall 24R, 24L, it is possible to improve the stiffness of the protective wall 12 with respect to the load from the rear side.

Referring to FIG. 3, the internal structure of the converter module 10 will be described. In the housing 20 of the converter module 10, a first converter 30, a duct 36, and a second converter 32 are arranged in this order from the bottom. The first converter 30 is a so-called DC/DC converter, and is an electric component that lowers the DC power supplied from the power source of the vehicle 100 (e.g., a battery pack, not shown in the drawing), and supplies power to the auxiliary load and the auxiliary battery (both are not shown in the drawing) of the vehicle 100. The first converter 30 is an example of an "electrical component" in the technology disclosed in the present specification. A heat sink 34 is provided on an upper surface of the first converter 30. The heat sink 34 is located in the duct 36 and dissipates heat from the first converter 30. Cooling air A1 is supplied from a blower fan (not shown) into the duct 36. The specific shape of the heat sink 34 is not particularly limited. As an example, the heat sink 34 in this embodiment includes a plurality of fins extending upward.

The second converter 32 is secured above the duct 36 by four brackets 38. The second converter 32 is a so-called DC/DC converter. The second converter 32 lowers the DC power supplied from the power supply (not shown) of the vehicle 100 and supplies the power to the auxiliary load and the auxiliary battery of the vehicle 100. Each bracket 38 extends from four corners of the bottom surface of the second converter 32 toward the bottom wall 18 of the base bracket 11. The lower ends of the brackets 38 are fixed to the bottom wall 18 of the base bracket 11 by bolts 39. Thus, the second converter 32 is held above the duct 36. A cable connector 33 is attached to the rear surface of the second converter 32. The cable connector 33 connects the second converter 32 and an auxiliary load (or auxiliary battery) in the vehicle 100.

As previously mentioned, the vehicle 100 houses electrical components, such as the first converter 30, the second converter 32, and the like, in a space below the luggage room 2. Therefore, for example, when a rear-surface collision occurs in the vehicle 100, the converters 30 and 32 may be damaged. In particular, each converter 30, 32 is a high voltage component that operates at a high voltage. The term "high voltage" as used herein means an operating voltage exceeding 60 volts DC or 30 volts AC (effective value). Hereinafter, with reference to FIGS. 4 and 5, a configuration in which the vehicle 100 of the present embodiment protects each of the converters 30 and 32 when a rear-surface collision occurs will be described.

Figure 4:
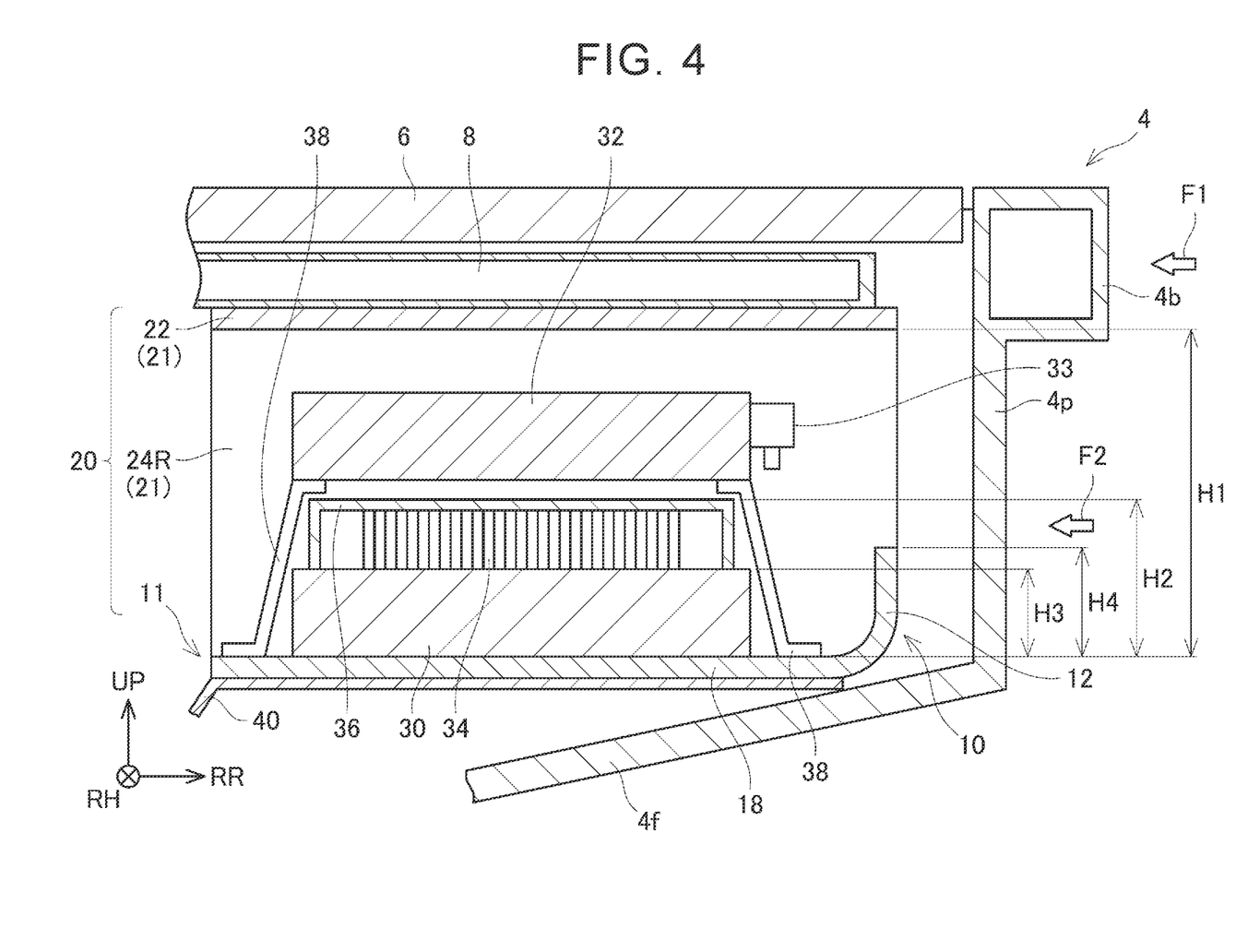
FIG. 4 shows a cross-sectional view along the line IV-IV of FIG. 2.
Figure 5:
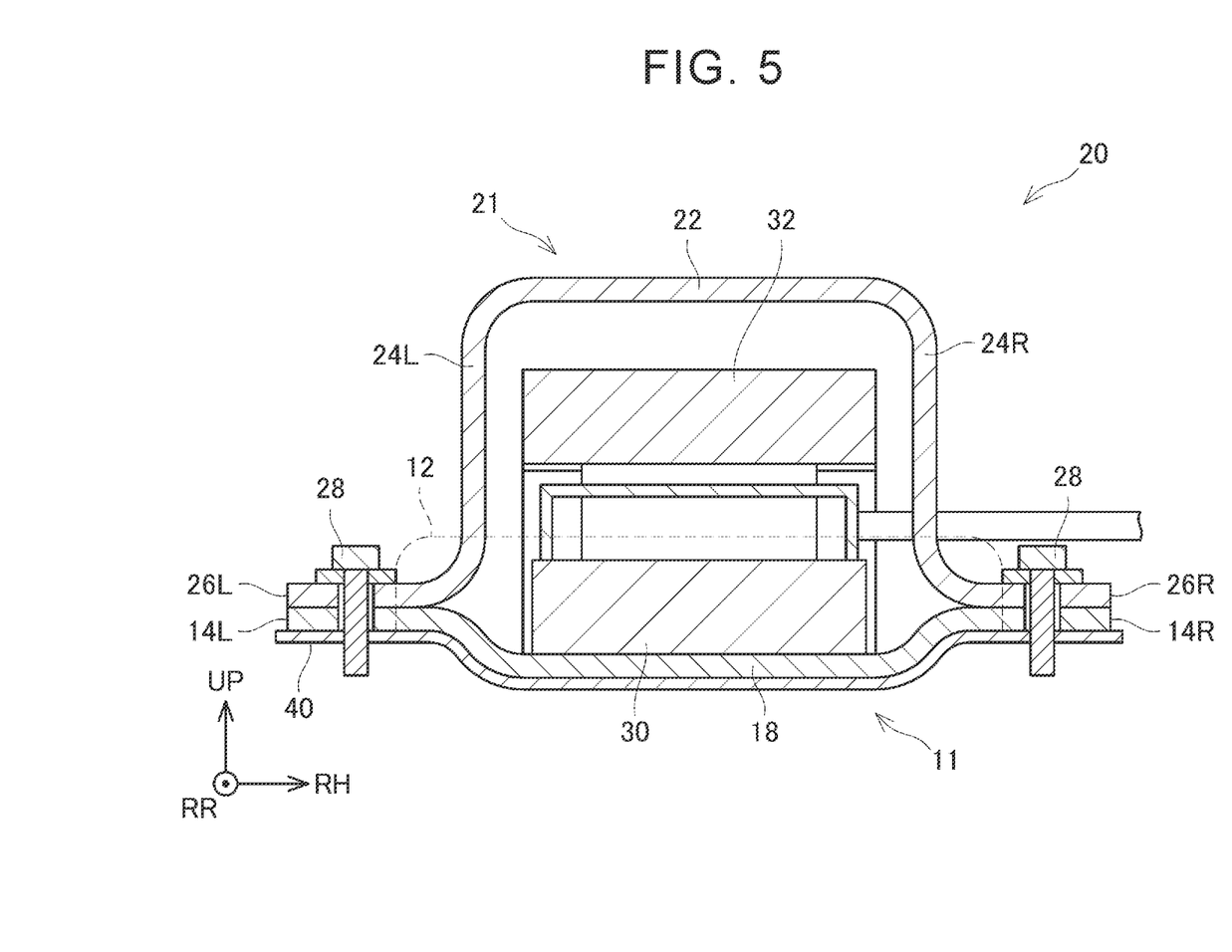
FIG. 5 shows a cross-sectional view along the line V-V of FIG. 2.

With reference to FIG. 4, the positional relationship between the converter module 10 and the vehicle body 4 will be described. FIG. 4 is a cross-sectional view taken along the line IV-IV of FIG. 2, and is a cross-sectional view taken at the center of the converter module 10 in the left-right direction. The manufacturer of the vehicle 100 first disposes the first converter 30 and the base bracket 11 to which the duct 36 is fixed from above with respect to the body bracket 40 fixed to the floor panel 4f of the vehicle body 4. The manufacturer then places the second converter 32 above the duct 36 and secures the second converter 32 to the bottom wall 18 of the base bracket 11 via the four brackets 38. Thereafter, the manufacturer places the cover 21 from above the second converter 32 and fastens the cover 21 and the base bracket 11 to the body bracket 40 by bolts 28, as shown in FIG. 5. As a result, the converter module 10 is fixed to the vehicle body 4. As described above, the cover 21 has a shape that opens the converters 30 and 32 in the front-rear direction. Therefore, the mass of the cover 21 is reduced as compared with a configuration in which the cover 21 covers the front and rear of each of the converters 30 and 32. As a result, the workability of the manufacturer who arranges the cover 21 can be improved.

The lower back 4b of the vehicle body 4 has a closed cross-section and is highly rigid. Further, the lower back 4b extends in the left-right direction. For this reason, for example, when another vehicle collides with the rear surface from the rear of the vehicle 100, the other vehicle applies a large load F1 to the lower back 4b in the front of the vehicle (that is, to the left of the paper in FIG. 4). Consequently, the lower back 4b moves toward the front of the vehicle. As shown in FIG. 4, the cover upper wall 22 of the cover 21 of the housing 20 faces the lower back 4b in the height direction. Therefore, the lower back 4b that has moved toward the front of the vehicle transmits the load F1 to the cover upper wall 22 of the cover 21.

As shown in FIG. 5, both left and right ends of the cover upper wall 22 are supported by a pair of cover side wall 24R, 24L. Further, the pair of cover side wall 24R, 24L is fastened to the body bracket 40 together with the base bracket 11 via the cover fixing portion 26R, 26L.

Therefore, the load F1 transmitted to the cover upper wall 22 of the cover 21 is distributed and transmitted to the pair of cover side walls 24R, 24L extending in the front-rear direction and the bottom wall 18 of the base bracket 11. The walls 22, 24R, 24L, and 18 extending in the front-rear direction are less likely to be deformed in the front-rear direction. Therefore, the converter module 10 accommodated in the housing 20 is protected from the load F1.

Further, when the height of the colliding object colliding with the vehicle 100 from the rear side is low, a large load F2 may be applied to the lower back panel 4p located below the lower back 4b in front of the vehicle. Then, the lower back panel 4p moves to the front of the vehicle. Consequently, the lower back panel 4p transmits the load F2 to the protective wall 12 of the base bracket 11.

As shown in FIG. 5, the protective wall 12 extends laterally beyond the pair of cover side wall 24R, 24L. Therefore, as described above, the load F2 applied to the protective wall 12 of the base bracket 11 is transmitted to the pair of cover side wall 24R, 24L in addition to the bottom wall 18 of the base bracket 11. Accordingly, the protective wall 12 protects the first converters 30 from the load F1 and the load F2.

Further, as described with respect to FIG. 2, in the third lower end E3, the protective wall 12 of the base bracket 11 is formed by drawing the border between the protective wall 12 and the bottom wall 18. Therefore, the protective wall 12 is highly rigid with respect to the load F2. Therefore, the protective wall 12 firmly protects the first converters 30 from the load F1 and the load F2.

Here, when the upper surface of the bottom wall 18 of the base bracket 11 is used as a reference, the height H4 of the protective wall 12 is larger than the height H3 of the upper surface of the first converter 30 and smaller than the height H2 of the upper end of the heat sink 34. In other words, the protective wall 12 covers the entire rear surface of the first converter 30, but does not cover the rear surface of the heat sink 34. Therefore, the protective wall 12 can, in particular, protect the first converter 30, which is an electric component, from the load F1, F2 more firmly than the heat sink 34. As a result, since the height of the protective wall 12 can be appropriately set, the mass of the base bracket 11 can be reduced.

When the upper surface of the bottom wall 18 of the base bracket 11 is used as a reference, the height H4 of the protective wall 12 is smaller than the height H1 of the cover upper wall 22 of the cover 21. As a result, a gap is provided between the upper end of the protective wall 12 and the lower end of the cover upper wall 22. As a result, the mass of the base bracket 11 can be reduced as compared with a configuration in which the protective wall 12 extends to the lower end of the cover upper wall 22. Further, as compared with the configuration in which the protective wall 12 extends to the lower end of the cover upper wall 22, when the cover 21 is removed, the access to the cable connector 33 becomes easy, and thus the workability can be improved.

Although the specific examples disclosed by the present disclosure have been described in detail above, these are merely examples and do not limit the scope of claims. The techniques described in the claims include various modifications and alternations of the specific example illustrated above. Modifications of the above-described embodiment are listed below.

First Modification

The converter module 10 may not include the second converter 32.

Second Modification

The cover 21 may not have a shape that opens the front of each converter 32.

Third Modification

The cover upper wall 22 of the cover 21 may be positioned lower than the lower back 4b of the vehicle body 4. The cover upper wall 22 may face the lower back panel 4p in the front-rear direction.

Fourth Modification

The height H4 of the protective wall 12 may be larger than the height H2 of the upper end of the heat sink 34.

Fifth Modification

The vehicle 100 may include a battery disposed at a rear portion of the vehicle body 4 instead of the converter module 10. In this case, the battery may be accommodated in the housing 20 having the base bracket 11 and the cover 21 described above. In the present modification, the battery is an example of an "electric component".

Modification 6

Both left and right ends of the protective wall 12 of the base bracket 11 may be located inside the pair of cover side wall 24R, 24L of the cover 21.

Modification 7

The lower end of the base bracket 11 may extend linearly in the left-right direction.

The technical elements described in the present specification or drawings exhibit technical usefulness alone or in various combinations, and are not limited to the combinations described in the claims at the time of filing. In addition, the techniques illustrated in the present specification or drawings can achieve a plurality of objectives at the same time, and achieving one of the objectives itself has technical usefulness.

What is claimed is:

1. A vehicle comprising:
a vehicle body;
an electric component disposed at a rear portion of the vehicle body;
a base bracket that covers a lower side of the electric component; and
a cover that is attached to the base bracket and that covers an upper side of the electric component, wherein:
the cover includes
a cover upper wall located above the electric component, and
a pair of cover side walls extending from the cover upper wall to the base bracket on both sides of the electric component in a right-left direction;
the cover has an open shape rearward of the electric component;
the base bracket includes a protective wall upwardly extending rearward of the electric component; and
a height of the protective wall with respect to the base bracket is less than a height of the cover upper wall with respect to the base bracket.

2. The vehicle according to claim 1, wherein the cover has an open shape forward of the electric component.

3. The vehicle according to claim 1, wherein the cover upper wall of the cover faces a lower back of the vehicle body or a panel extending downward from the lower back in a front-rear direction.

4. The vehicle according to claim 1, wherein:
a heat sink for radiating heat from the electric component is provided on an upper surface of the electric component; and
the height of the protective wall is greater than a height of the upper surface of the electric component and less than a height of an upper end of the heat sink.

5. The vehicle according to claim 1, wherein the protective wall of the base bracket extends in the right-left direction beyond the pair of cover side walls.

6. The vehicle according to claim 1, wherein:
the base bracket includes
a first lower end extending in the right-left direction at a central portion of the protective wall in the right-left direction,
a second lower end that is located outside the first lower end in the right-left direction and that extends upward to the first lower end in the right-left direction, and
a third lower end that connects the first lower end and the second lower end; and
the protective wall of the base bracket extends in the right-left direction beyond the third lower end.

* * * * *